UNITED STATES PATENT OFFICE.

GEORGE KOSTA, OF PHILADELPHIA, PENNSYLVANIA.

SILVER-CLEANING COMPOUND.

1,315,630.  Specification of Letters Patent.  Patented Sept. 9, 1919.

No Drawing.  Application filed June 3, 1916.  Serial No. 101,547.

*To all whom it may concern:*

Be it known that I, GEORGE KOSTA, a citizen of the United States, residing at Philadelphia, county of Philadelphia, State of Pennsylvania, have invented certain new and useful Improvements in Silver-Cleaning Compounds, of which the following is a specification.

My invention relates to a compound for cleaning silver articles.

It has for one of its objects to provide a compound, the ingredients of which not only are cheap but may be readily obtained. In consequence of this a compound embodying my invention may be cheaply and economically manufactured.

A still further object of my invention is to provide a cleaning compound which may be easily used as well as one which has no injurious effects upon the hands of anyone who may use the same for the purpose of cleansing silver articles.

In the manufacture of a compound embodying my invention I take the shells of two dozen eggs and place them in about one gallon of boiling water and boil the same therein for not less than a half-hour, after which the water and any matter which may have dissolved out of the said shells are drawn off and the shells allowed to dry, the liquid portion in the meantime cooling. After the shells have become dry they are finely powdered. The liquid portion previously separated from the said shells is then heated to about the boiling point and the finely powdered egg shells introduced into the same. At about the same time about three-quarters of a pound or a pound of soap powder is introduced into the said liquid after which the powdered egg shells and the soap powder are thoroughly stirred into the liquid, the latter being maintained at or about the boiling point for a period of ten to twelve minutes. The mixture is thereafter removed from the fire or other heating means. When it has cooled down to a point such that the hand may be inserted thereinto without scalding, the silver to be cleaned is inserted into the liquid compound and withdrawn and rinsed in clear hot water.

The silver so treated will be found to be quite bright and clean and will not require any rubbing or polishing.

Although I have hereinbefore referred to the use of two dozen egg shells, I desire it to be understood that my invention is not limited to that specific number of egg shells to the gallon of water, as the number may be varied within limits without interfering with the desirable practical results as indicated.

In view of the fact that egg shells are composed largely of calcium carbonate with only a relatively small portion of other elements or ingredients, such as the phosphates of lime and magnesia and organic matter and sulfur, the said compound may be properly described as comprising a mixture of a calcareous substance, soap powder and water.

Having thus described my invention, what I claim and desire to secure by Letters Patent is:

1. A silver cleaning compound comprising a mixture of powdered egg shells, soap powder and water, the soap powder being in a state of solution.

2. A silver cleaning compound comprising a mixture of about two dozen egg shells in a finely powdered condition, about three-quarters of a pound of soap powder and about one gallon of water, substantially as described.

In testimony that I claim the foregoing as my invention I have hereunto signed my name this 2nd day of June, A. D. 1916.

GEORGE KOSTA.